(12) United States Patent
Kuenzler et al.

(10) Patent No.: US 9,500,355 B2
(45) Date of Patent: Nov. 22, 2016

(54) LAMP WITH LIGHT EMITTING ELEMENTS SURROUNDING ACTIVE COOLING DEVICE

(71) Applicant: GE Lighting Solutions, LLC, East Cleveland, OH (US)

(72) Inventors: Glenn Howard Kuenzler, Beachwood, OH (US); Jeremias Anthony Martins, Twinsburg, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 68 days.

(21) Appl. No.: 13/665,959

(22) Filed: Nov. 1, 2012

(65) Prior Publication Data

US 2013/0294068 A1 Nov. 7, 2013

Related U.S. Application Data

(60) Provisional application No. 61/643,056, filed on May 4, 2012.

(51) Int. Cl.
*F21V 29/00* (2015.01)
*F21V 29/60* (2015.01)
(Continued)

(52) U.S. Cl.
CPC .......... *F21V 29/60* (2015.01); *F21K 9/13* (2013.01); *F21K 9/135* (2013.01); *F21K 9/50* (2013.01);
(Continued)

(58) Field of Classification Search
CPC ............. F21V 29/027; F21V 29/2237; F21V 29/2262; F28F 13/12; F21K 9/135
(Continued)

(56) References Cited

U.S. PATENT DOCUMENTS

| 3,341,689 A | 9/1967 | Reichenbach |
| 4,120,565 A | 10/1978 | Rabl et al. |

(Continued)

FOREIGN PATENT DOCUMENTS

| DE | 202012101158 U1 | 4/2012 |
| EP | 2233832 A1 | 9/2010 |

(Continued)

OTHER PUBLICATIONS

Cree, "Cree® XLampe® XB-D LED 75-watt Equivalent A19 Lamp Reference Design", pp. 1-15, 2012.

(Continued)

*Primary Examiner* — Peggy Neils
*Assistant Examiner* — Alexander Garlen
(74) *Attorney, Agent, or Firm* — GE Global Patent Operation; Peter T. DiMauro

(57) ABSTRACT

A lamp is provided with multiple light emitting elements such as e.g., LEDs, positioned about a heat sink. The heat sink contains an active cooling device that provides a flow of air over the heat sink to transfer heat away from the light emitting elements. One or more optical elements are positioned over the light emitting elements to e.g., assist in light distribution. The lamp construction improves the dissipation of heat while also providing for a more omni-directional distribution of light intensity. Embodiments of the lamp can be provided with one or more features to enhance aesthetic appeal and improve manufacturability.

14 Claims, 6 Drawing Sheets

(51) Int. Cl.

| | | |
|---|---|---|
| F21K 99/00 | (2016.01) | |
| F21V 29/74 | (2015.01) | |
| F21V 29/507 | (2015.01) | |
| F21V 7/04 | (2006.01) | |
| F21V 5/02 | (2006.01) | |
| F21V 7/00 | (2006.01) | |
| F21V 13/02 | (2006.01) | |
| F21V 29/63 | (2015.01) | |
| F21V 29/75 | (2015.01) | |
| F21V 29/83 | (2015.01) | |
| G02B 27/09 | (2006.01) | |
| F21V 29/67 | (2015.01) | |
| F21V 29/70 | (2015.01) | |
| F21V 29/02 | (2006.01) | |
| F21V 3/02 | (2006.01) | |
| F21V 7/22 | (2006.01) | |
| F21V 23/00 | (2015.01) | |
| F21Y 101/02 | (2006.01) | |
| F21Y 105/00 | (2016.01) | |
| F21Y 113/00 | (2016.01) | |
| F21V 29/77 | (2015.01) | |

(52) U.S. Cl.
CPC .............. *F21V 5/02* (2013.01); *F21V 7/0091* (2013.01); *F21V 7/041* (2013.01); *F21V 7/048* (2013.01); *F21V 13/02* (2013.01); *F21V 29/507* (2015.01); *F21V 29/63* (2015.01); *F21V 29/67* (2015.01); *F21V 29/70* (2015.01); *F21V 29/74* (2015.01); *F21V 29/75* (2015.01); *F21V 29/83* (2015.01); *G02B 27/0972* (2013.01); *F21V 3/02* (2013.01); *F21V 7/22* (2013.01); *F21V 23/006* (2013.01); *F21V 29/02* (2013.01); *F21V 29/773* (2015.01); *F21Y 2101/02* (2013.01); *F21Y 2105/001* (2013.01); *F21Y 2105/008* (2013.01); *F21Y 2113/005* (2013.01); *Y02B 20/30* (2013.01)

(58) Field of Classification Search
USPC .............. 362/234, 235, 240, 249.02, 249.04, 362/294, 373; 313/46
See application file for complete search history.

(56) References Cited

U.S. PATENT DOCUMENTS

| | | | |
|---|---|---|---|
| 4,506,316 A | | 3/1985 | Thiry et al. |
| 5,405,251 A | | 4/1995 | Sipin |
| 5,906,429 A | | 5/1999 | Mori et al. |
| 6,142,652 A | | 11/2000 | Richardson |
| 6,218,785 B1 | | 4/2001 | Incerti |
| 6,350,041 B1 | | 2/2002 | Tarsa et al. |
| 6,814,470 B2 | | 11/2004 | Rizkin et al. |
| 6,833,565 B2 | | 12/2004 | Su et al. |
| D508,575 S | | 8/2005 | Buschmann et al. |
| 7,086,756 B2 * | | 8/2006 | Maxik .................... 362/249.04 |
| D528,227 S | | 9/2006 | Chou et al. |
| D531,741 S | | 11/2006 | Takahashi |
| D534,665 S | | 1/2007 | Egawa et al. |
| 7,223,000 B2 | | 5/2007 | Yamamura |
| 7,258,464 B2 | | 8/2007 | Morris et al. |
| 7,434,964 B1 * | | 10/2008 | Zheng et al. ................. 362/294 |
| 7,581,856 B2 * | | 9/2009 | Kang et al. .................. 362/373 |
| 7,637,639 B2 | | 12/2009 | Epstein |
| 7,760,499 B1 | | 7/2010 | Darbin et al. |
| 7,784,972 B2 | | 8/2010 | Heffington et al. |
| 7,932,535 B2 | | 4/2011 | Mahalingam et al. |
| 8,030,886 B2 | | 10/2011 | Mahalingam et al. |
| 8,035,966 B2 | | 10/2011 | Reichenbach et al. |
| 8,066,410 B2 | | 11/2011 | Booth et al. |
| D653,365 S | | 1/2012 | Yuan et al. |
| 8,094,393 B2 | | 1/2012 | Minano et al. |
| 8,136,576 B2 | | 3/2012 | Grimm |
| 8,152,318 B2 | | 4/2012 | Richardson |
| D658,788 S | | 5/2012 | Dudik et al. |
| D660,991 S | | 5/2012 | Allen et al. |
| 8,299,691 B2 | | 10/2012 | Grimm |
| 8,314,537 B2 * | | 11/2012 | Gielen et al. ................. 313/46 |
| 8,414,160 B2 * | | 4/2013 | Sun et al. .................... 362/294 |
| 8,608,347 B2 | | 12/2013 | Chinniah et al. |
| 2005/0174780 A1 | | 8/2005 | Park |
| 2007/0147046 A1 | | 6/2007 | Arik et al. |
| 2007/0159828 A1 * | | 7/2007 | Wang ............................ 362/294 |
| 2007/0165411 A1 | | 7/2007 | Abdelsamed |
| 2008/0009187 A1 | | 1/2008 | Grimm et al. |
| 2008/0192480 A1 | | 8/2008 | Rizkin et al. |
| 2009/0084866 A1 | | 4/2009 | Grimm et al. |
| 2009/0148320 A1 | | 6/2009 | Lucas |
| 2009/0225430 A1 | | 9/2009 | Barnes et al. |
| 2009/0310368 A1 | | 12/2009 | Incerti et al. |
| 2010/0053963 A1 | | 3/2010 | Yang et al. |
| 2010/0123397 A1 | | 5/2010 | Tian et al. |
| 2010/0170657 A1 | | 7/2010 | Kaslusky |
| 2011/0037387 A1 | | 2/2011 | Chou et al. |
| 2011/0063800 A1 | | 3/2011 | Park |
| 2011/0080096 A1 | | 4/2011 | Dudik et al. |
| 2011/0080740 A1 | | 4/2011 | Allen et al. |
| 2011/0089804 A1 | | 4/2011 | Mahalingam et al. |
| 2011/0089830 A1 * | | 4/2011 | Pickard et al. ................. 315/32 |
| 2011/0122582 A1 | | 5/2011 | Park et al. |
| 2011/0140148 A1 | | 6/2011 | Liu |
| 2011/0140149 A1 | | 6/2011 | Liu et al. |
| 2011/0156584 A1 * | | 6/2011 | Kim .............................. 315/32 |
| 2011/0162823 A1 | | 7/2011 | Sharma et al. |
| 2011/0169394 A1 | | 7/2011 | Chowdhury et al. |
| 2011/0170299 A1 | | 7/2011 | Takase et al. |
| 2011/0204790 A1 | | 8/2011 | Arik et al. |
| 2011/0215345 A1 | | 9/2011 | Tarsa et al. |
| 2011/0215698 A1 * | | 9/2011 | Tong et al. .................... 313/46 |
| 2011/0234078 A1 | | 9/2011 | Choi et al. |
| 2011/0242816 A1 | | 10/2011 | Chowdhury et al. |
| 2011/0286200 A1 | | 11/2011 | Iimura et al. |
| 2012/0008330 A1 | | 1/2012 | Horng et al. |
| 2012/0026740 A1 | | 2/2012 | Kim et al. |
| 2012/0051058 A1 | | 3/2012 | Sharma et al. |
| 2012/0080669 A1 | | 4/2012 | Yamazaki et al. |
| 2012/0080699 A1 | | 4/2012 | Chowdhury et al. |
| 2012/0140486 A1 | | 6/2012 | Chou et al. |
| 2012/0161626 A1 | | 6/2012 | Van et al. |
| 2012/0182711 A1 | | 7/2012 | Kolodin |
| 2012/0188775 A1 | | 7/2012 | Chuang |
| 2012/0194054 A1 * | | 8/2012 | Johnston et al. ................ 313/46 |
| 2012/0218768 A1 | | 8/2012 | Hisano et al. |
| 2012/0243235 A1 | | 9/2012 | Gao |
| 2012/0262915 A1 | | 10/2012 | Lin et al. |
| 2013/0063962 A1 | | 3/2013 | Huang et al. |
| 2013/0176721 A1 | | 7/2013 | Lu et al. |
| 2013/0176722 A1 | | 7/2013 | Lay et al. |
| 2013/0201680 A1 | | 8/2013 | Allen et al. |
| 2013/0294086 A1 | | 11/2013 | Mayer et al. |

FOREIGN PATENT DOCUMENTS

| | | |
|---|---|---|
| GB | 2195047 A | 3/1988 |
| JP | 62199999 A | 9/1987 |
| JP | 01233796 A | 9/1989 |
| JP | 2000304908 A | 11/2000 |
| JP | 2003346526 A | 12/2003 |
| WO | 2009071111 A1 | 6/2009 |
| WO | 2010146518 A1 | 12/2010 |
| WO | 2011089103 A1 | 7/2011 |
| WO | 2011159961 A1 | 12/2011 |
| WO | 2012084674 A1 | 6/2012 |

OTHER PUBLICATIONS

Jiang et al., "TIR Optics Enhance the Illuminance on Target for Directional LED Modules", LEDs Magazine, http://ledsmagazine.com/features/9/2/8, Feb. 2012.

(56) References Cited

OTHER PUBLICATIONS

PCT Search Report and Written Opinion issued in connection with related Application No. PCT/US2013/037556 on Jul. 12, 2013.
PCT Search Report and Written Opinion issued in connection with related Application No. PCT/US2013/039482 on Jul. 25, 2013.
PCT Search Report and Written Opinion issued in connection with related Application No. PCT/US2013/039513 on Jul. 25, 2013.
PCT Search Report and Written Opinion issued in connection with related Application No. PCT/US2013/039464 on Aug. 1, 2013.
PCT Search Report and Written Opinion issued in connection with related Application No. PCT/US2013/067973 on Feb. 4, 2014.
European Office Action issued in connection with related EP Application No. 13724956.1 on Jan. 29, 2016.
Mark J. Mayer et al., filed Dec. 6, 2012, U.S. Appl. No. 13/706,798.
Glenn Howard Kuenzler et al., filed Nov. 4, 2014, U.S. Appl. No. 14/398,887.
Glenn Howard Kuenzler et al., filed Nov. 4, 2014, U.S. Appl. No. 14/398,944.
Karl Kristian Udris et al., filed Dec. 11, 2012, U.S. Appl. No. 13/710,782.
Benjamin Lee Yoder et al., filed Nov. 10, 2014, U.S. Appl. No. 14/536,957.
European Search Report and Opinion issued in connection with related EP Application No. 13719685.3 on Jan. 18, 2016.
US Final Office Action issued in connection with related U.S. Appl. No. 13/706,798 on Jun. 10, 2015.

* cited by examiner

LAMP WITH LIGHT EMITTING ELEMENTS SURROUNDING ACTIVE COOLING DEVICE

FIELD OF THE INVENTION

This application claims benefit of priority from earlier filed, commonly owned, copending U.S. Provisional Patent Application 61/643056, filed 4 May 2012. Said Provisional Patent Application is hereby incorporated by reference.

The subject matter of the present disclosure relates generally to a lamp having multiple light emitting elements such as e.g., LEDs, that are positioned about an active cooling device contained in a heat sink.

BACKGROUND OF THE INVENTION

As compared to incandescent lamps, other types of light emitting elements are available that have certain advantages. For example, light emitting diodes (LEDs) can provide a light output comparable to an incandescent lamp but at a significantly improved energy efficiency. Additionally, the lifetime of an LED lamp can be substantially longer than an incandescent lamp.

LEDs can also be configured in a lamp that includes a threaded base (sometimes referred to as an "Edison base") making it interchangeable with conventional incandescent lamps. Optical elements can also be provided that, in addition to light scattering, can provide an LED-based lamp with a shape similar to that of conventional incandescent lamps. The color and intensity of light provided by the LED-based lamp can also be similar to incandescent lamps.

However, lamps based on solid state light emitting sources such as LEDs typically require operation at relatively low temperatures for device performance and reliability reasons. For example, the junction temperature for a typical LED device should be below 150° C. and in some LED devices should be below 100° C. or even lower. At these low operating temperatures, radiative heat transfer to the surrounding environment is weak compared with that of conventional light sources.

With LED light sources, the convective and radiative heat transfer from the outside surface area of the lamp or luminaire can be enhanced by the addition of a heat sink. A heat sink is a component providing a large surface for radiating and convecting heat away from the LED devices. In a typical design, the heat sink is a relatively massive metal element having a large engineered surface area, for example, by having fins or other heat dissipating structures on its outer surface. Where equipped with a large surface area, the heat fins can provide heat egress by radiation and convection.

However, even with the use of a heat sink, significant challenges remain for sufficient heat dissipation from the lamp. For example, depending upon the amount of light intensity desired, multiple light emitting devices such as LEDs may be desirable. Depending upon e.g., the number of such light emitting devices that are employed, the heat sink alone may not be able to adequately dissipate heat from the lamp through passive means. While increasing the size of the heat sink could improve the dissipation of heat, such may be undesirable because it may cause the overall size of the lamp to exceed specification for form such as e.g., the ANSI A19 profile.

Additionally, some light emitting devices have directional limitations that also present challenges for lamp design. For example, LED devices are usually flat-mounted on a circuit board such that the light output is substantially along a line perpendicular to the plane of the circuit board. Thus, a flat LED array typically does not provide a uniformly distributed omnidirectional light output that may be desirable for many lamp applications. Achieving the desired omnidirectional light distribution thus requires specialized optics that incur a significant penalty in light loss in order to spread the light evenly.

Another challenge relates to aesthetics. A lamp designed only with consideration of performance requirements regarding light output, energy usage, thermal management, etc. may not provide an appearance that is pleasing to e.g., certain consumers. Such can affect the marketability of lamp even if it otherwise performs well.

Accordingly, a lamp that can have improved energy efficiency over traditional incandescent lamps while providing a comparable or better light intensity distribution would be beneficial. Such a lamp that can also be provided with one or more features for providing sufficient heat dissipation where heat generating light emitting elements such as e.g., LEDs are employed would also be very useful. Such a lamp that can also be provided with aesthetically acceptable features would also be beneficial.

BRIEF DESCRIPTION OF THE INVENTION

The present invention provides a lamp with multiple light emitting elements such as e.g., LEDs, that are positioned about a heat sink. The heat sink contains an active cooling device that provides a flow of air over the heat sink to transfer heat away from the light emitting elements. One or more optical elements are positioned over the light emitting elements to e.g., assist in light distribution. However, unlike the optics required for the aforementioned LED array, these optics can be designed for a higher optical efficiency because they do not have to turn or spread the light as much in order to achieve the overall omnidirectional light distribution. The lamp construction improves the dissipation of heat while also providing for an omni-directional distribution of light intensity with lower optical loss. Lower loss is an advantage because it lowers the total input power requirement and thus eases the thermal challenge compared to other designs. Embodiments of the lamp can be provided with one or more features to enhance aesthetic appeal and improve manufacturability. Additional aspects and advantages of the invention will be set forth in part in the following description, or may be apparent from the description, or may be learned through practice of the invention.

In one exemplary embodiment, the present invention provides an actively cooled lamp. The lamp defines axial, radial, and circumferential directions. The lamp includes a housing and a heat sink connected with the housing. The heat sink includes a plurality of fins for dissipating heat away from the lamp. The heat sink defines a chamber and a plurality of openings positioned about the heat sink for allowing a flow of air in or out of the chamber. The openings are positioned so as to direct air flow along the fins of the heat sink. An active cooling device is positioned within the chamber of the heat sink and configured for creating a flow of air through the openings in the heat sink. A plurality of light emitting elements are positioned about the heat sink and spaced apart along the circumferential direction. The light emitting elements are also positioned between the fins of the heat sink. A plurality of optical elements are positioned over the light emitting elements so as to receive and distribute light from each of the light emitting elements.

In another exemplary embodiment, the present invention provides an actively cooled lamp. The lamp includes a heat sink having a plurality of fins for conducting heat. The heat sink defines a chamber and a plurality of openings spaced about the heat sink. A plurality of light emitting elements are in thermal communication with the heat sink. The light emitting elements are spaced apart about a periphery of the heat sink and are proximate to the plurality of openings. The light emitting elements are oriented to provide an omnidirectional output of light. An active cooling device is positioned in the chamber of the heat sink in fluid communication with the openings of the heat sink so that the active cooling device creates a flow of air through the openings.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
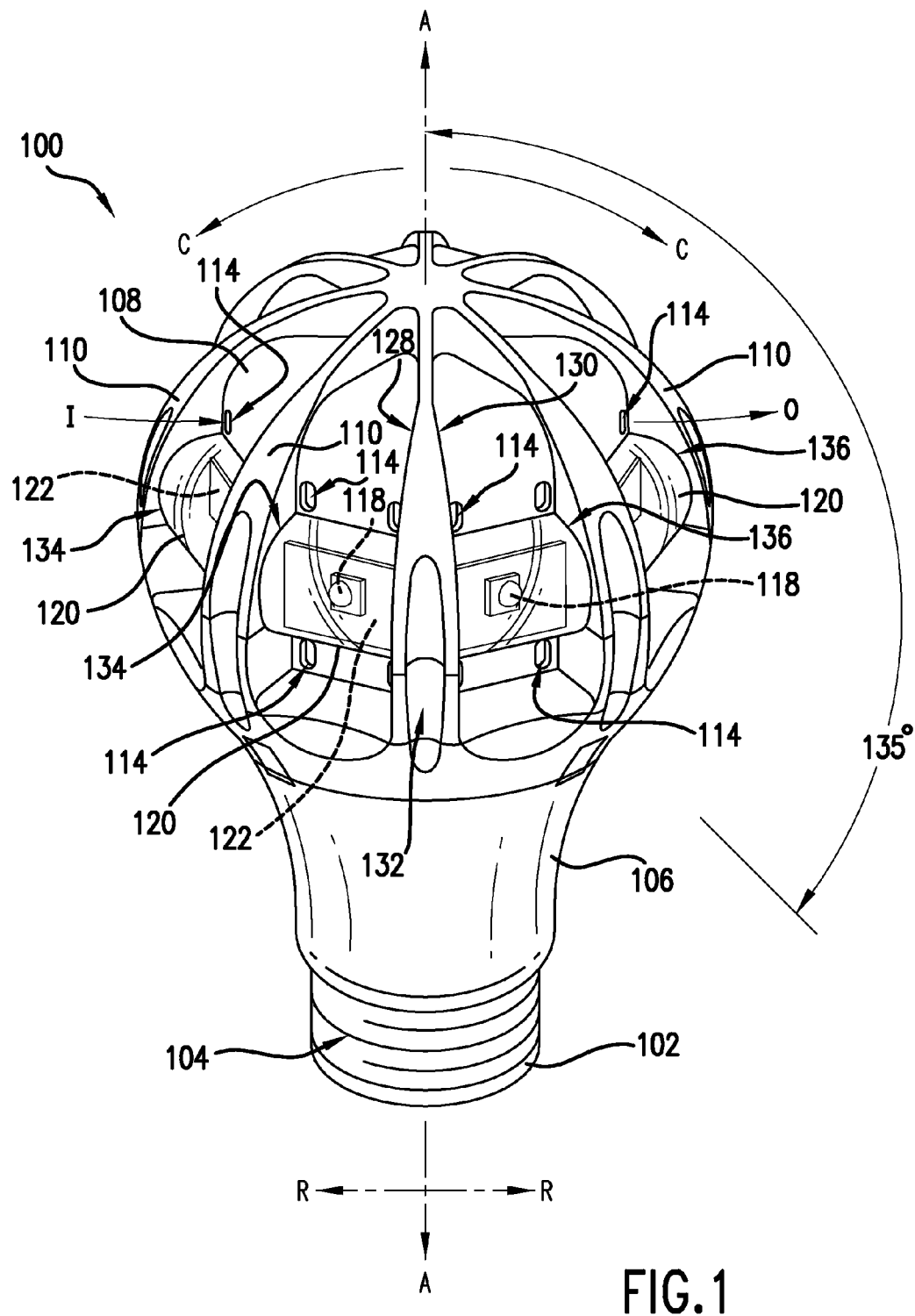
FIG. 1 provides a perspective view of an exemplary embodiment of a lamp of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
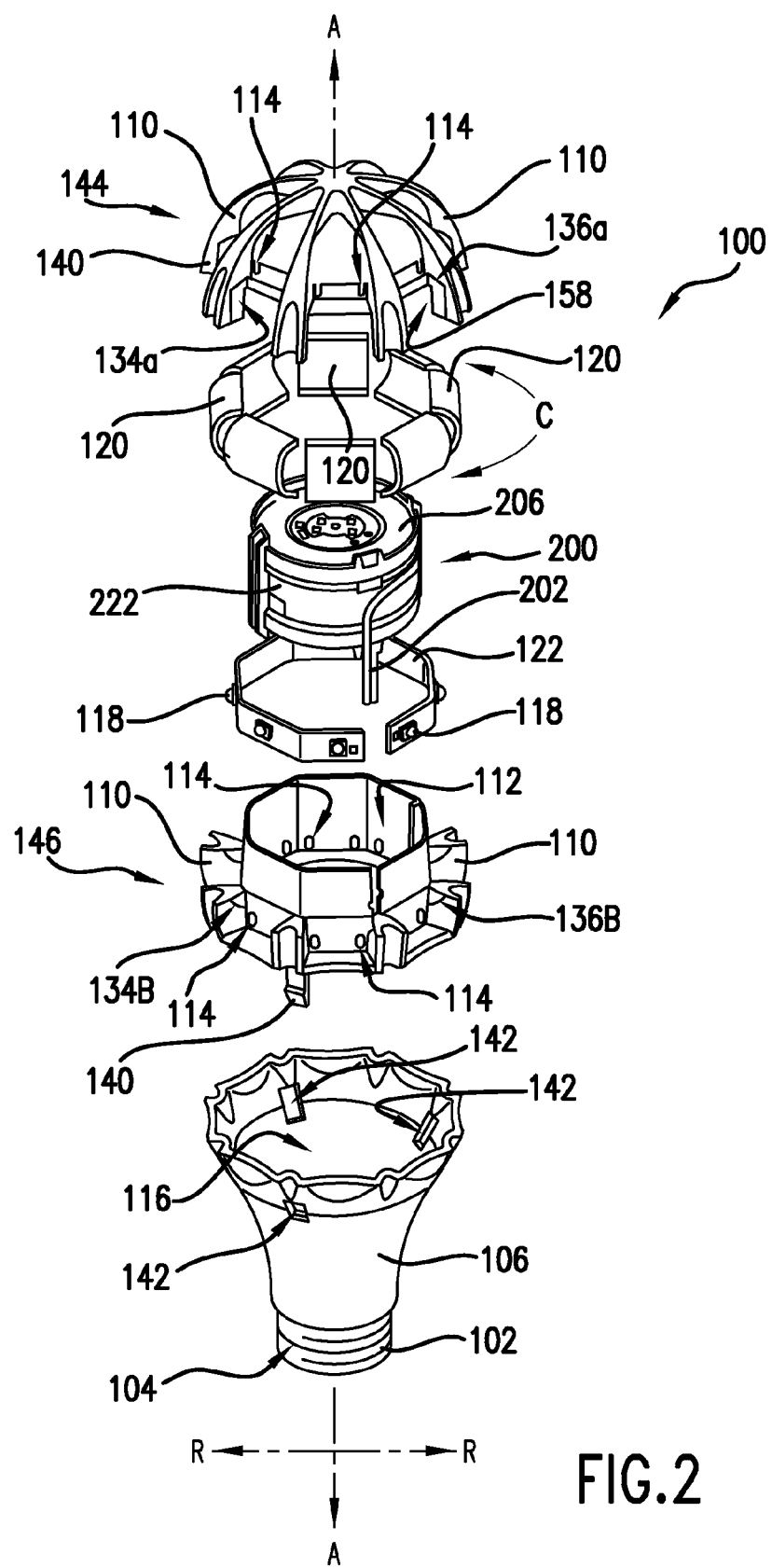
FIG. 2 illustrates an exploded view of the exemplary lamp of FIG. 1.
Figure 3:
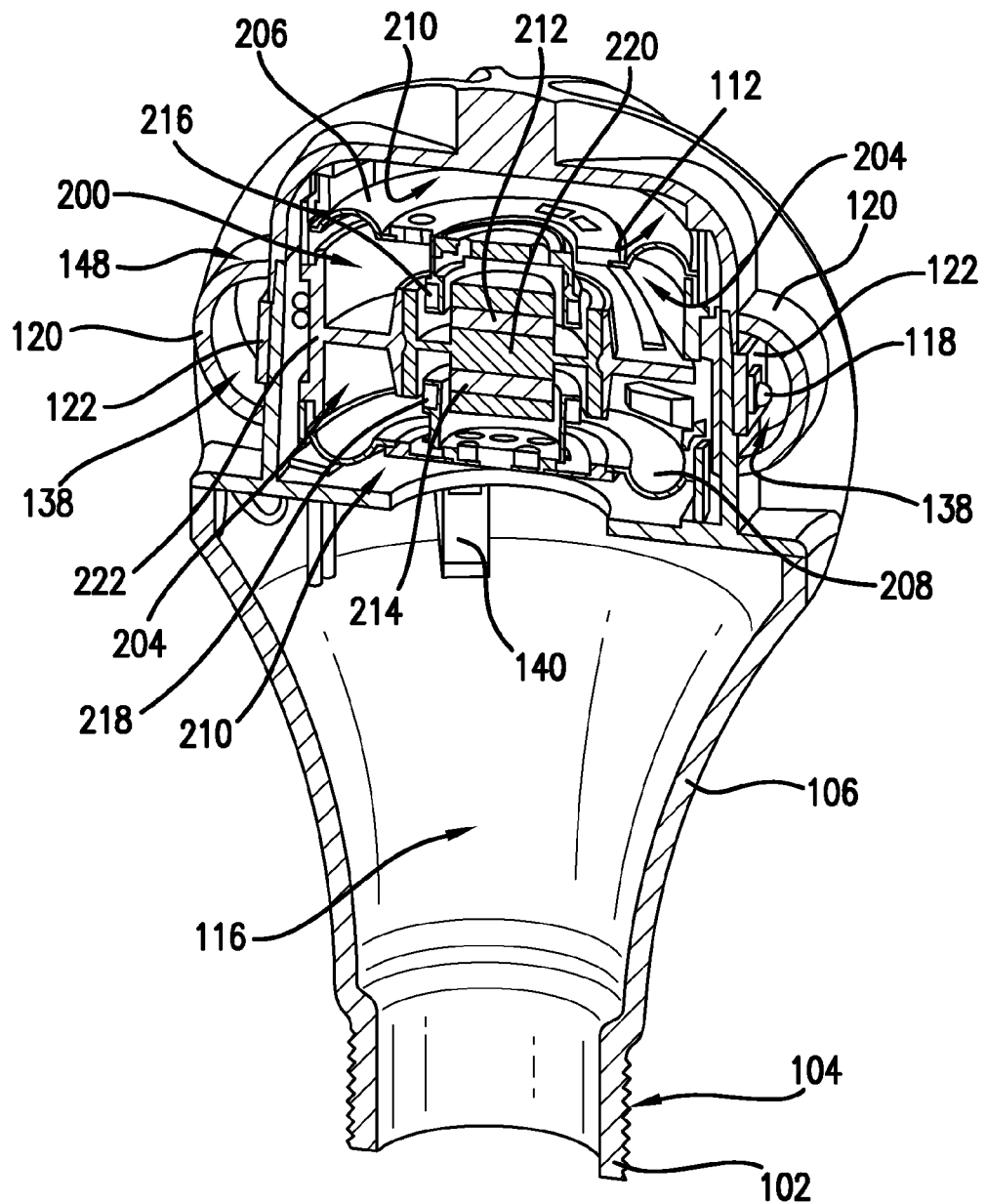
FIG. 3 is a cross-sectional view of the exemplary embodiment of FIGS. 1 and 2.
Figure 4:
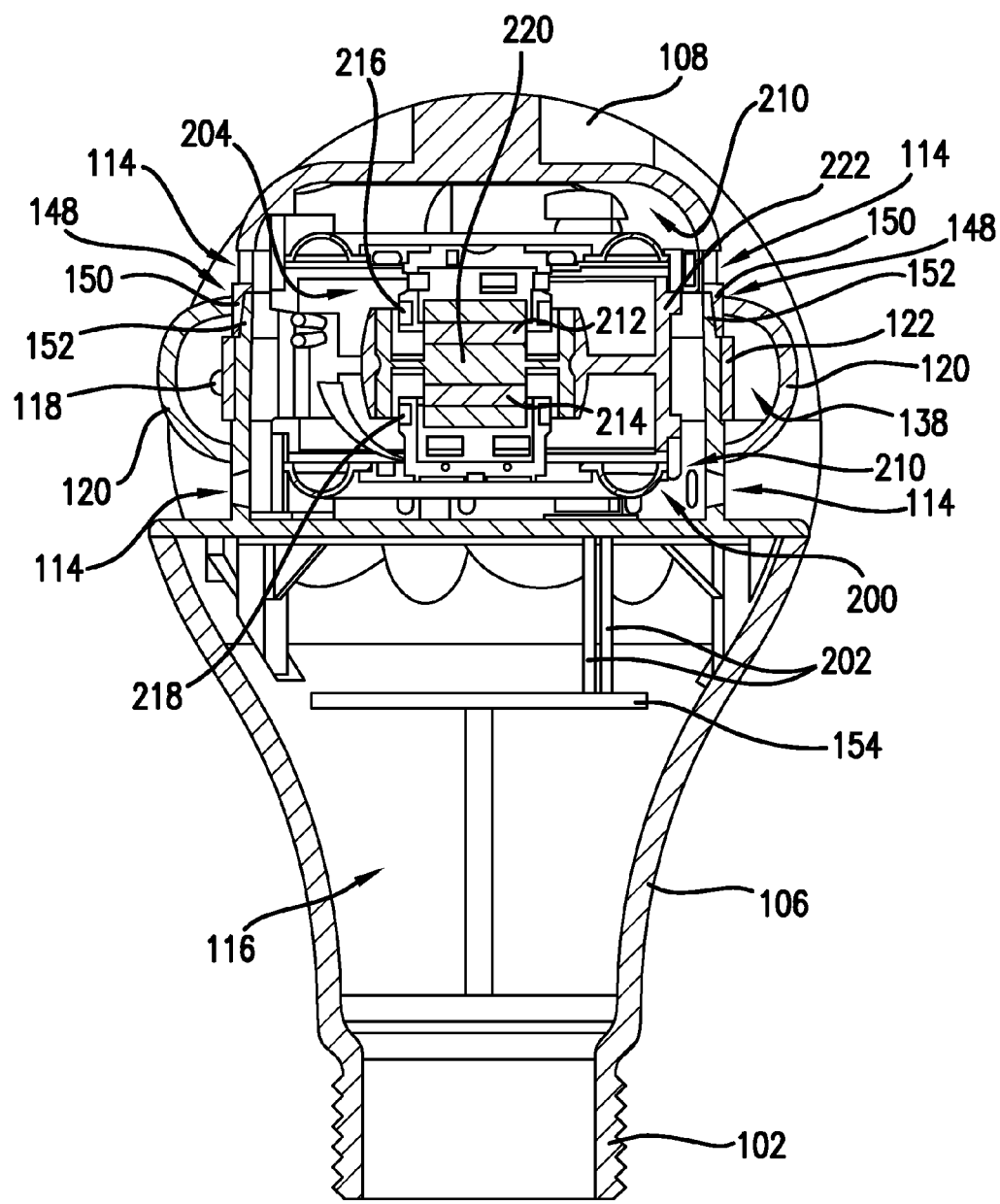
FIG. 4 is another cross-sectional view of the exemplary embodiment of FIGS. 1-2 taken along a plane that intersects several of the openings defined by the heat sink.
Figure 5:
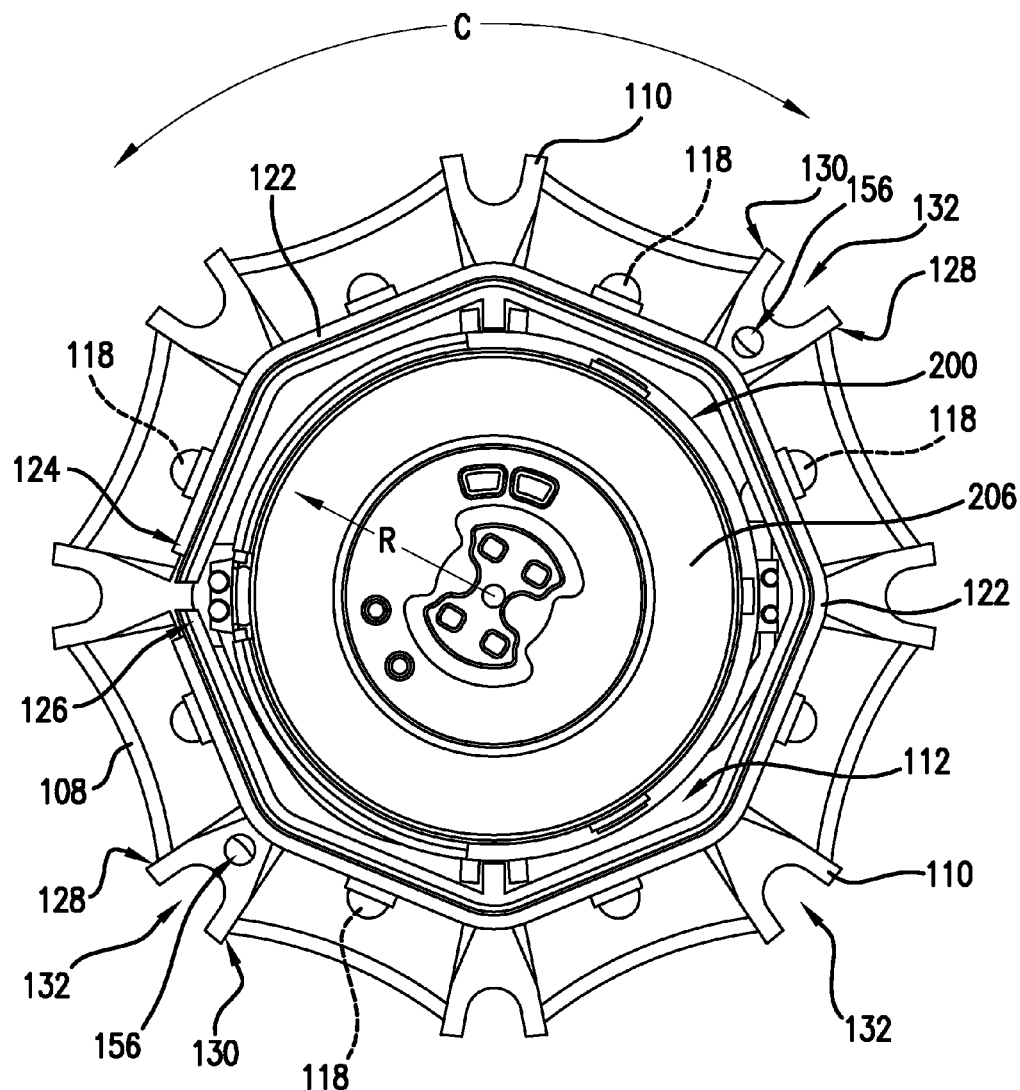
FIG. 5 is a top down view of the exemplary embodiment of FIGS. 1-3 but with an outer portion of the heat sink removed for purposes of revealing certain internal components.

FIG. 1 is a perspective view of an exemplary embodiment of a lamp 100 of the present invention while FIG. 2 provides an exploded view. As shown, and for purposes of describing this exemplary embodiment, lamp 100 defines an axial direction A extending along its center, a circumferential direction C extending about the periphery of lamp 100, and a radial direction R which is normal to axial direction A. FIGS. 3 and 4 are cross-sectional views taken at different planes in lamp 100 but with each such plane intersecting, and parallel to, axial direction A. FIG. 5 is a top down view of lamp 100 with an outer portion 144 of a heat sink 108 removed for purposes of further revealing certain details as will be described below.

Lamp 100 includes a housing 106 connected with a base 102. As shown, base 102 includes threads 104 for connection into a conventional socket to provide electrical power to operate lamp 100. Base 102, referred to sometimes as an "Edison" base is provided by way of example only. Other constructions may also be employed for connecting lamp 100 with a power source as well. Housing 106 may be constructed from e.g., a plastic material while base 102 is constructed from one or more metals to provide electrical conductivity.

Housing 106 defines an interior space 116. By way of example, interior space 116 may include one more electronic components such as e.g., electronic driver 154 (FIG. 4) for providing power and/or control to other components of lamp 100. The overall shape of lamp 100 includes housing 106, and may be similar to a conventional incandescent bulb meeting the ANSI A19 profile. Other shapes and constructions may also be used.

A heat sink 108 is connected with housing 106. For this exemplary embodiment, heat sink 108 is constructed from outer portion 144 and an inner portion 146. Each portion 144 and 146 includes a tapered edge 150 and 152, respectively. Upon assembly, tapered edges 150 and 152 are joined tightly to form a taper fit 148 that provides for effective heat transfer between portions 144 and 146 while also holding the same together.

Heat sink 108 also includes a plurality of fins 110 for dissipating heat away from the lamp and particularly away from a plurality of light emitting elements 118. For this exemplary embodiment, fins 110 extend along axial direction A and are spaced apart from each other along circumferential direction C. Along the axial direction A, fins 110 increase in thickness and include a groove 132. As shown, groove 132 also extends along the axial direction A and opens in radially-outward direction. Grooves 132 help increase the surface area of fins 110 so as to improve their effectiveness in dissipating heat while also providing an aesthetic characteristic to lamp 100.

Heat sink 108 also internally defines a chamber 112 and a plurality of openings 114 that are spaced apart along circumferential direction C, but some openings may be at different locations along axial direction A. Openings along radial direction R may also be used. Openings 114 allow for a flow of air between chamber 112 and the environment external to chamber 112. For example, air may flow into, or out of, chamber 112 through openings 114. With this exemplary embodiment, openings 114 are spaced on both axial sides of light emitting elements 118—i.e. they may be above and below light emitting elements 118 when lamp 100 is oriented as shown in FIGS. 1-4. Additionally, openings 114 are also positioned so as to cause air moving therethrough to flow along fins 110 for purposes of improving heat exchange. This air flow may include air that actually passes through opening 114 as well as air that is entrained therein. Other configurations, including different shapes and locations, may be used for openings 114 as well.

Heat sink 108 may be constructed from a variety of high thermal conductivity materials that will promote the transfer of heat from the thermal load provided by light emitting elements 118 to ambient and thereby reduce the temperature rise that would otherwise result from the thermal load. Exemplary materials can include metallic materials such as alloy steel, cast aluminum, extruded aluminum, and copper, or the like. Other materials can include engineered composite materials such as thermally-conductive polymers as well as plastics, plastic composites, ceramics, ceramic composite materials, nano-materials, such as carbon nanotubes (CNT) or CNT composites. Other configurations may include a plastic heat sink body comprising a thermally conductive (e.g., copper) layer disposed thereupon, such as disclosed in US Patent Publication 2011-0242816, hereby incorporated by reference. Exemplary materials can exhibit thermal conductivities of about 50 W/m-K, from about 80 W/m-K to about 100 W/m-K, 170 W/m-K, 390 W/m-K; or, from about 1 W/m-K to about 50 W/m-K.

In order to maximize light output from lamp 100, heat sink 108 and/or fins 110 may comprise a reflective layer, such as a reflective layer which has a reflectivity for visible light of greater than about 90%. Reflective heat sinks which may be employed include those described and enabled in US Patent Publication 2012-0080699, which is hereby incorporated by reference.

An active cooling device 200 is positioned within chamber 112 of heat sink 108. Active cooling device 200 is constructed so that, when operating, it creates the flow of air through openings 114 as previously discussed. For this exemplary embodiment, cooling device 200 is provided as a synthetic jet actuator that is configured for causing air to flow in and out of openings 114 so as to create a flow of air across fins 110 of heat sink 108. Active cooling device 200 may be electrically connected with electronic driver 154 by e.g., wires 202 (FIG. 4). As such, electronic driver 154 can provide power and/or control for active cooling device 200.

Positioning the active cooling device within chamber 112 of heat sink 108 provides certain advantages for lamp 100. For example, such positioning provides more room in the interior space of housing 106 for other components. This additional room can be used to incorporate e.g., additional and/or larger electronic components for the electronic driver into interior space 116. Additionally, ducts or channels for the flow of air between openings 114 and active cooling device 200 can be reduced or eliminated by positioning active cooling device 200 closer to openings 114. Other benefits such as improvement in thermal management may also be achieved.

As stated above, lamp 100 includes a plurality of light emitting elements 118 that are positioned about heat sink 108 and are spaced apart along the circumferential direction C. For this exemplary embodiment, light emitting elements 118 are provided as LEDs 118 that are mounted upon, and electrically connected with, a printed circuit board 122. In turn, circuit board 122 may be electrically connected with electronic driver 154, which provides power and/or control of LEDs 118. The embodiment illustrated includes eight LEDs spaced apart circumferentially about the periphery of heat sink 108. Other numbers of LEDs may be used as well including, for example, six and seven. In addition, other types of light emitting elements 118 other than LED-based elements may be used.

A plurality of optical elements 120 are positioned over the LEDs 118. Optical elements 120 receive light from LEDs 118 and help distribute the same. As used herein, the term "optical elements" may generally refer to one or more of diffusers, reflectors, and/or any associated light management elements such as e.g., lenses; or combinations thereof; or the like. For example, optical elements 120 may be constructed as diffusers that are made from materials (glass, polymers such as polycarbonates, or others) that help scatter light received from LEDs.

Optical elements 120 are secured into position between a pair of fins 110. More particularly, each fin has a pair of opposing sides 128 and 130 (FIG. 1). Each side 128 and 130 is provided with a recess 136 and 134, respectively. Recess 136 has a component 136a on the outer portion 144 of heat sink 108 and a component 136b on the inner portion 146 of heat sink 108 (FIG. 2). Similarly, recess 134 has a component 134a on the outer portion 144 of heat sink 108 and a component 134b on the inner portion 146 of heat sink 108 (FIG. 2). Accordingly, when lamp 100 is constructed by connecting the outer portion 144 and inner portion 146 of heat sink 108, each of the optical elements 120 is secured into a pair of recesses 136 and 134 provided by a pair of opposing sides 128 and 130 of fins 110. As shown in FIGS. 3 and 4, the positioning of each optical element 120 between a pair of fins 110 creates a channel 138 that is closed at its ends by a respective fin 110. Such construction e.g., aids the manufacturability of lamp 100 by trapping optical elements 120 into place.

As best shown in FIGS. 1 and 2, LEDs 118 are oriented radially outward. In this orientation, the circumferential spacing of LEDs 118, and optical elements 120 together assist in providing a lamp 100 having an omnidirectional output. As depicted in FIG. 1 using lamp 100, "omnidirectional" as used herein means that the variation in light intensity measured at any distance from central axis A over the range of zero degrees (the zenith direction when the lamp is oriented base-down) to 135 degrees is not more than ±20% from the average light intensity measured over that same range. In another exemplary embodiment, such variation in light intensity is not more than ±10% from the average light intensity at angles measured from zero to 150 degrees.

Referring now to FIGS. 2 and 5, for this exemplary embodiment, LEDs 118 are mounted upon a single printed circuit board 122 that is in thermal communication with heat sink 108. By way of example, board 122 can be attached to heat sink 108 using a thermal grease, adhesive, or other material that improves heat transfer to the heat sink and/or helps secure board 122 into place. In addition, the radially inward side of each fin 110 includes a recess 158 (FIG. 2) into which circuit board 122 is received during the assembly of lamp 100. Circuit board 122 extends along the circumferential direction such that it surrounds (i.e. wraps around) the periphery of heat sink 108. Circuit board 122 can be constructed e.g., from a flexible material that extends between first end 124 and second end 126 (FIG. 5). In one exemplary embodiment, circuit board 122 is constructed from a thin, flexible, metal core printed circuit board that can be readily bent into the desired shape to surround or encircle heat sink 108. Other constructions may be used as well.

As previously stated, for this exemplary embodiment of lamp 100, active cooling device 200 is illustrated as a synthetic jet actuator that is positioned within chamber 112 of heat sink 108 at a position radially inward of LEDs 118. Referring now to FIGS. 3, 4, and 5, synthetic jet actuator 200 is configured in a size and manner that permits lamp 100 to have an A19 form factor. However, design configurations having different form factors could be used as well.

Actuator 200 is in fluid communication with openings 114 spaced about heat sink 108. More particularly, actuator 200 moves to create pulses of air that are ultimately moved through openings 114 to create a cooling flow of air over fins 110 and enhance heat transfer from the heat sink 108, thereby actively cooling lamp 100. To this end, actuator 200 includes a pair of diaphragms 206 and 208, which travel in opposition to generate the flow of air.

Using e.g., a controlled, oscillating wave of electrical current provided through power supply wires 202, diaphragms 206 and 208 can be moved towards and away from each other in a cyclic manner to create the flow of air in and out of openings 114. For example, in a first part of the cycle, synthetic jet actuator 200 moves diaphragms 206 and 208 towards each other so as to expel air from the inner portion 204. The structure of actuator 200 and heat sink 108 can be configured so as to route this flow of air as desired. Thus, for the embodiment shown in FIGS. 3, 4, and 5, the air in chamber 112 is divided into portions. Inner portion 204 (FIGS. 3 and 4) is located inside actuator 200 while outer portion 210 is located outside of actuator 200 in the space between actuator 200 and chamber 112. An opening (not shown) in housing 222 allows the air expelled from inner portion 204 to exit through openings 114 located on one side of lamp 100 as represented by arrow O in FIG. 1. At the same time, the movement of diaphragms 206 and 208 towards each other also draws air into the outer portion 210 through openings 114 located along the other side of lamp 100 as represented by arrow I in FIG. 1. In a second part of the cycle for actuator 200, the movement of diaphragms 206 and 208 are away from each other so that air is drawn into inner portion 204 and expelled from outer portion 210. Thus, the cyclic movement of diaphragms 206 and 208 can be utilized to create active cooling by a flow of air through openings 114.

The movement of diaphragms 206 and 208 is caused by the interaction of magnets 212 and 214 with magnetic fields created by an electrical current in copper coils 216 and 218, respectively. Diaphragms 206 and 208 are connected to, and move with, coils 216 and 218. Magnets 212 and 214 are stationary and are connected with back iron 220.

The operation of actuator 200 as just described is provided by way of example only. Other methods and configurations may be used as well. For example, chamber 112 can be divided into three portions to provide air flows through openings 114. Also, the active cooling device is not limited to synthetic jet actuator 200. Other active cooling devices may also be employed in additional embodiments of the invention.

In general, any active cooling device of the present disclosure (such as the synthetic jet actuator described above) may be characterized by its efficiency expressed in terms of flow rate of air from the cooling device per watt of power input to the cooling device. For actuator 200, the flow rate of air is the volume of air displaced by the movement of the diaphragms 206 and 208 of the cooling device, per unit time. In accordance with certain exemplary embodiments, the active cooling device 200 comprises a synthetic jet actuator operating at less than about six cubic feet per minute (CFM) per watt (six ft³/min/W). "Watts of input power" refers to the power consumption of the cooling device itself, not necessarily the power required to operate a lamp as a whole. In still other embodiments, a cooling device of the present disclosure may be characterized by an efficiency of less than about 4 CFM/W (e.g., 1-4 CFM/W), or less than about 2 CFM/W, or about 1 CFM/W.

Figure 6:
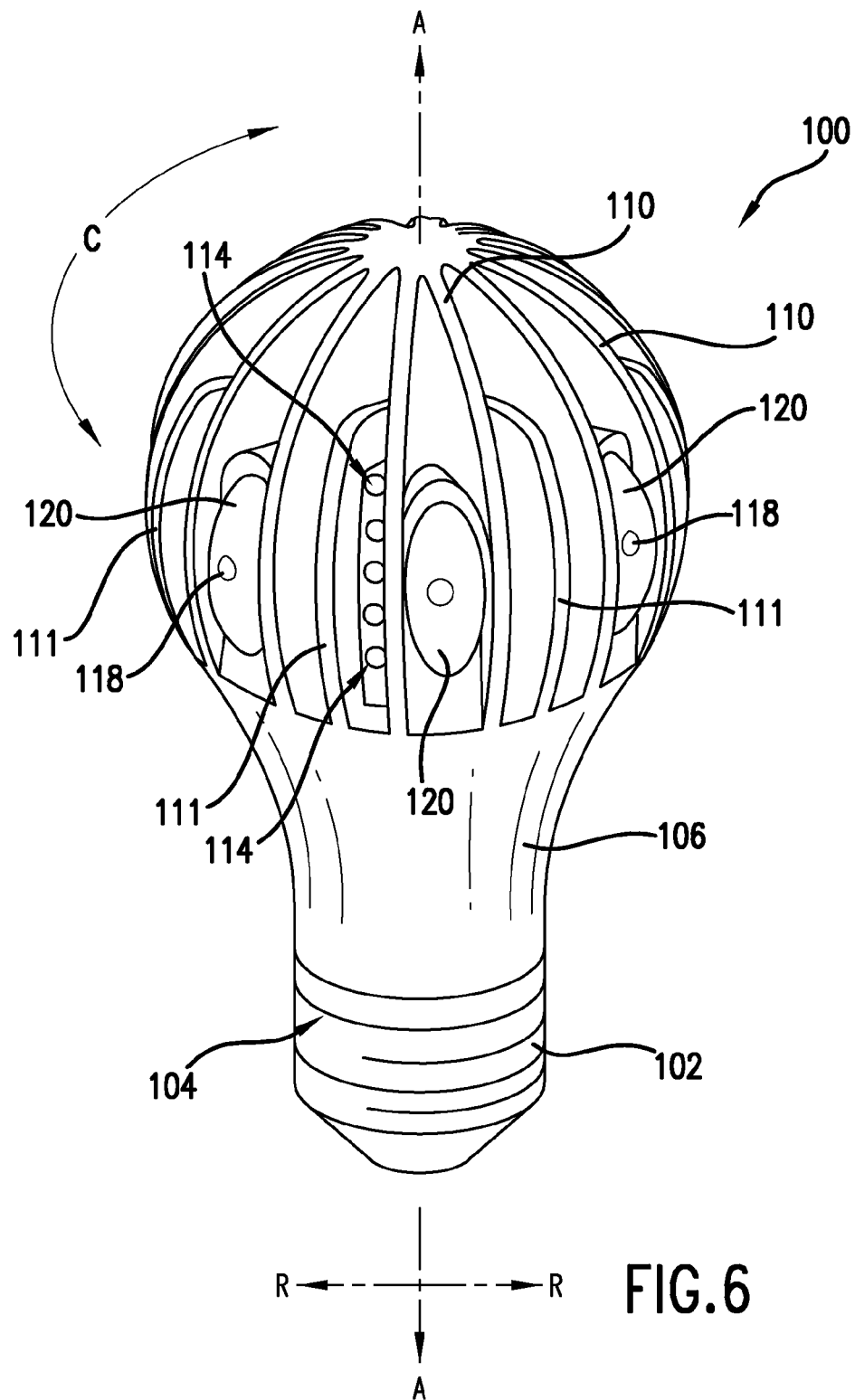
FIG. 6 is a perspective view of another exemplary embodiment of the present invention.

FIG. 6 illustrates another exemplary embodiment of a lamp 100 of the present invention. Although constructed with components similar to the embodiment of FIGS. 1-5, lamp 100 of FIG. 6 provides different aesthetics. For example, for the embodiment of FIG. 6, lamp 100 includes fins 110 that are narrower and lack grooves 132. Smaller fins 111 are also positioned between the larger fins 110. Also, while LEDs 118 are still spaced about the circumferential direction C, optical element 120 is provided with a different shape and, therefore, different appearance. Also, openings 114 for the air flow in and out of chamber 112 are still positioned to cause a flow of air over fins 110 but also cause a flow over smaller fins 111. Additionally, openings 114 are aligned along the axial direction. FIG. 6 is provided by way of example only. As will be understood by one of skill in the art using the teachings disclosed herein, other configurations may be used as well that will provide a different appearance while still employing novel features of the present invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An actively cooled lamp, the lamp defining axial, radial, and circumferential directions, the lamp comprising:
   a housing;
   a heat sink connected with said housing, said heat sink including a plurality of fins on an outer surface thereof for dissipating heat away from the lamp, said heat sink defining a chamber and a plurality of openings positioned about the heat sink for allowing a flow of air in or out of the chamber, the openings positioned so as to direct air flow along the fins of said heat sink, wherein the chamber comprises no ducts or channels;
   an active cooling device positioned within the chamber of said heat sink and configured for creating a flow of air through the openings in said heat sink without ducts or channels;
   a plurality of light emitting elements positioned about said heat sink and spaced apart along the circumferential direction, said light emitting elements positioned between the fins of said heat sink;
   a plurality of optical elements positioned over said light emitting elements so as to receive and distribute light from each of said light emitting elements; and
   an electronic driver that is electrically connected with, and provides power to, said light emitting elements, said active cooling device, or both;
   wherein said housing defines an interior space into which said electronic driver is received.

2. An actively cooled lamp as in claim 1, further comprising:
   a circuit board attached to said heat sink and extending along the circumferential direction about said heat sink;
   wherein said light emitting elements are mounted upon, and electrically connected with, said circuit board.

3. An actively cooled lamp as in claim 2, wherein said light emitting elements comprise LEDs that are oriented radially outward.

4. An actively cooled lamp as in claim 2, wherein said circuit board comprises a flexible or bendable printed circuit board.

5. An actively cooled lamp as in claim 1, wherein the fins of said heat sink each comprise a pair of opposing sides spaced apart along the circumferential direction, wherein the opposing sides define a plurality of recesses, the recesses each receiving one of said optical elements.

6. An actively cooled lamp as in claim 5, wherein said optical elements and said heat sink define a channel extending between a pair of the fins of said heat sink with at least one of said light emitting elements positioned in the channel.

7. An actively cooled lamp as in claim 1, wherein said heat sink comprises an outer portion and an inner portion mechanically joined together.

8. An actively cooled lamp as in claim 7, wherein said outer portion and said inner portion each comprise a tapered edge whereby the outer portion and inner portion are joined together by a taper fit to form said heat sink.

9. An actively cooled lamp as in claim 1, wherein said active cooling element comprises a synthetic jet actuator configured to move air in and out of the chamber through the openings in said heat sink.

10. An actively cooled lamp as in claim 9, wherein said synthetic jet actuator is configured to operate at less than about six $ft^3$/min/W (cubic feet per minute per watt of input power to the actuator).

11. An actively cooled lamp as in claim 1, wherein the light emitting elements and the optical elements are configured to provide a lamp that, in operation, has an omnidirectional output with a variation in light intensity measured at any distance from a lamp axis over the range of zero degrees to 135 degrees of not more than ±20% from the average light intensity measured over that same range.

12. An actively cooled lamp as in claim 1, wherein said heat sink and said active cooling device divide the chamber into at least two portions configured so that the active cooling device causes air to be expelled through the openings connected with one portion while drawing in air through the openings connected with the other portion.

13. An actively cooled lamp as in claim 1, wherein said optical element comprises a diffuser.

14. An actively cooled lamp, the lamp defining axial, radial, and circumferential directions, the lamp comprising:

a housing;

a heat sink connected with said housing, said heat sink including a plurality of fins on an outer surface thereof for dissipating heat away from the lamp, said heat sink defining a chamber and a plurality of openings positioned about the heat sink for allowing a flow of air in or out of the chamber, the openings positioned so as to direct air flow along the fins on the outer surface of said heat sink;

an active cooling device positioned within the chamber of said heat sink and configured for creating a flow of air through the openings in said heat sink without ducts or channels between the openings and the active cooling device, and wherein the chamber comprises no ducts or channels between the openings and active cooling device;

a plurality of light emitting elements positioned about said heat sink and spaced apart along the circumferential direction, said light emitting elements positioned between the fins on the outer surface of said heat sink;

a plurality of optical elements positioned over said light emitting elements so as to receive and distribute light from each of said light emitting elements, wherein the fins on the outer surface of said heat sink each comprise a pair of opposing sides spaced apart along the circumferential direction, wherein the opposing sides define a plurality of recesses, the recesses each receiving one of said optical elements; and an electronic driver that is electrically connected with, and provides power to, said light emitting elements, said active cooling device, or both;

wherein said housing defines an interior space into which said electronic driver is received.

\* \* \* \* \*